H. C. MILLIGAN.
COOKING VESSEL.
APPLICATION FILED MAY 13, 1915.
1,225,047. Patented May 8, 1917.
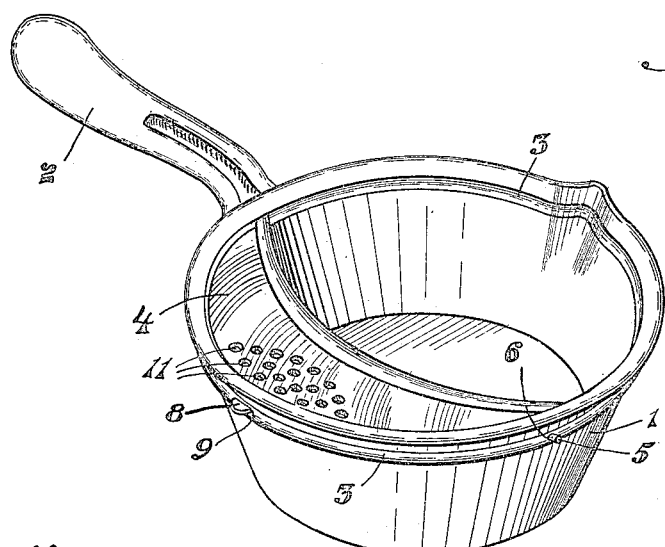
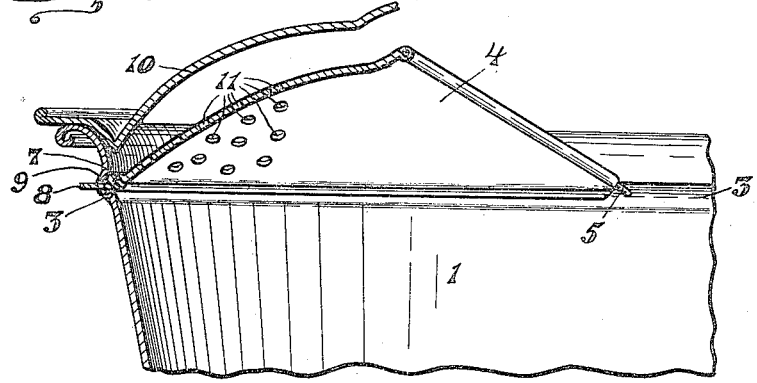
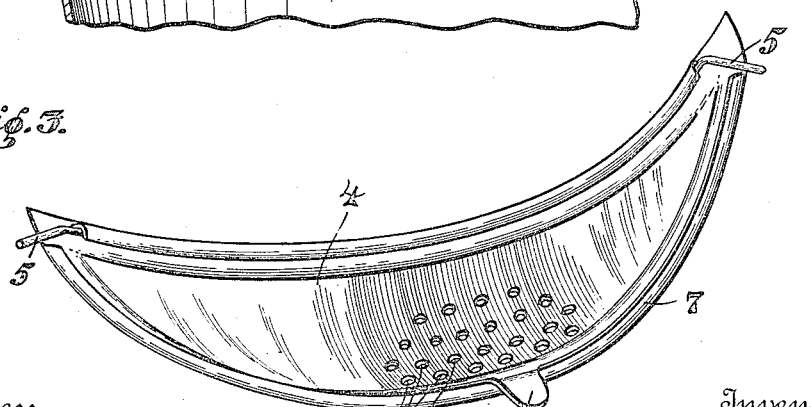
Witness
Robert Karcher
Inventor
Henry C. Milligan
By F. W. Bond
Attorney

UNITED STATES PATENT OFFICE.

HENRY C. MILLIGAN, OF CANTON, OHIO.

COOKING VESSEL.

1,225,047.　　　　Specification of Letters Patent.　　Patented May 8, 1917.

Application filed May 13, 1915.　Serial No. 27,781.

*To all whom it may concern:*

Be it known that I, HENRY C. MILLIGAN, a citizen of the United States, residing at Canton, in the county of Stark and State of Ohio, have invented a new and useful Cooking Vessel, of which the following is a specification.

My invention relates to improvements in cooking vessels in which an ordinary cooking vessel is employed, together with a perforated draining or straining plate which is located upon one side of the vessel.

The objects of the present invention are, first, to provide a perforated plate connected to the vessel, and second, to provide for the removal of said perforated plate.

These objects, together with other objects readily apparent to those skilled in the art, may be attained by the construction illustrated in the accompanying drawings, although the invention may be embodied in other forms, the construction illustrated being chosen by way of example.

In the accompanying drawing:

Figure 1 is a perspective view.

Fig. 2 is a sectional view.

Fig. 3 is a bottom or under side view of the straining or draining plate.

Similar numerals of reference indicate corresponding parts throughout all the figures of the drawings.

In the accompanying drawing, 1 represents the vessel which may be of any size, reference being had to convenience in handling and to the various uses common to articles of this kind. The vessel 1 may be provided with the handle 2 or any equivalent device designed for use in handling the vessel. The inner upper surface of the vessel 1 is provided with the groove 3, which groove is for the purpose of receiving the vessel contact edge of the draining plate 4. In some instances it may be desirable to detachably connect the draining plate 4 to the vessel and in other instances it may be desirable to permanently attach the draining plate. So far as the actual use of the article is concerned it is of little consequence as to whether or not the draining plate is detachably connected or permanently connected. The object of detachably connecting the draining plate is to provide for its removal so that the vessel can be nested for shipping or storing in stock.

The draining plate 4 when constructed, to be detachably connected to the vessel is provided with the wire 5, which wire is held in position by the ordinary method of beading. The wire 5 is extended beyond the bead at each end of the bead which extended portions are placed through suitable apertures 6, said apertures being located through the grooved or corrugated portion of the vessel 1.

The vessel contact edge of the straining plate 4 is provided with the fold or bead 7, which fold or bead is for the double purpose of adding rigidity to the straining plate and holding the plate to the vessel in such a manner that there will be no relative movement as between the draining plate and the vessel. For the purpose of assisting in holding the draining plate in a firm condition upon the vessel the tang 8 is provided, which tang is passed through the slot or opening 9, the bead 7 being seated in the groove 3, this being true as to whether or not the plate is permanently attached or detachably connected to the vessel. The draining plate 4 is preferably formed crescent shaped and convexo-concave in cross section and longitudinally, by which arrangement the inner edge of the draining plate at its central portion is elevated so that when the vessel is tipped at an angle for draining purposes the articles contained in the vessel to be drained will not be so liable to become accidentally displaced from the vessel.

The cover 10 is of the usual construction and within itself forms no specific part of the present invention, but a portion of said cover is illustrated in Fig. 2 in a conventional way.

Having fully described my invention what I claim as new and desire to secure by Letters Patent, is—

As an improved article of manufacture, the combination of a vessel body, the inner surface of said body provided with a groove and openings located through the vessel body, a strainer plate adapted to be seated in the groove, a tang located upon the strainer plate and adapted to be extended through one of the openings, a wire beaded to said strainer plate and the ends of said wire extended outward and adapted to be located through apertures located at the ends of the strainer plate.

In testimony that I claim the above, I have hereunto subscribed my name.

HENRY C. MILLIGAN.

Copies of this patent may be obtained for five cents each, by addressing the "Commissioner of Patents, Washington, D. C."